May 12, 1964 V. N. TRAMONTINI ETAL 3,132,805
TEMPERATURE SENSITIVE CONTROL DEVICE
Filed Feb. 15, 1962
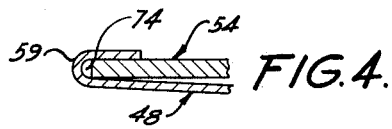
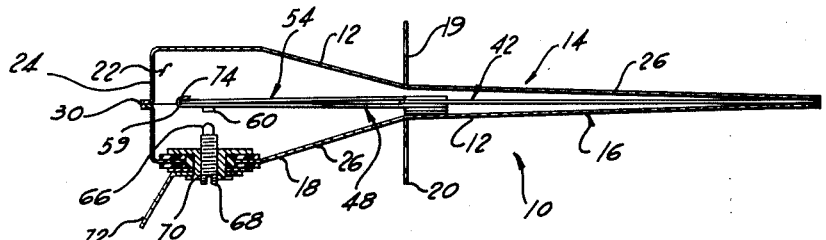
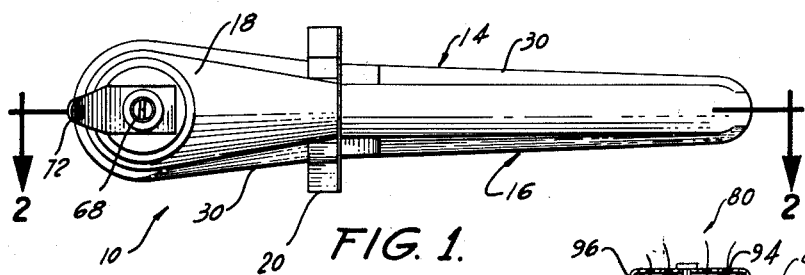
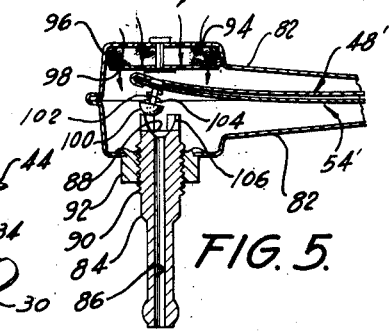
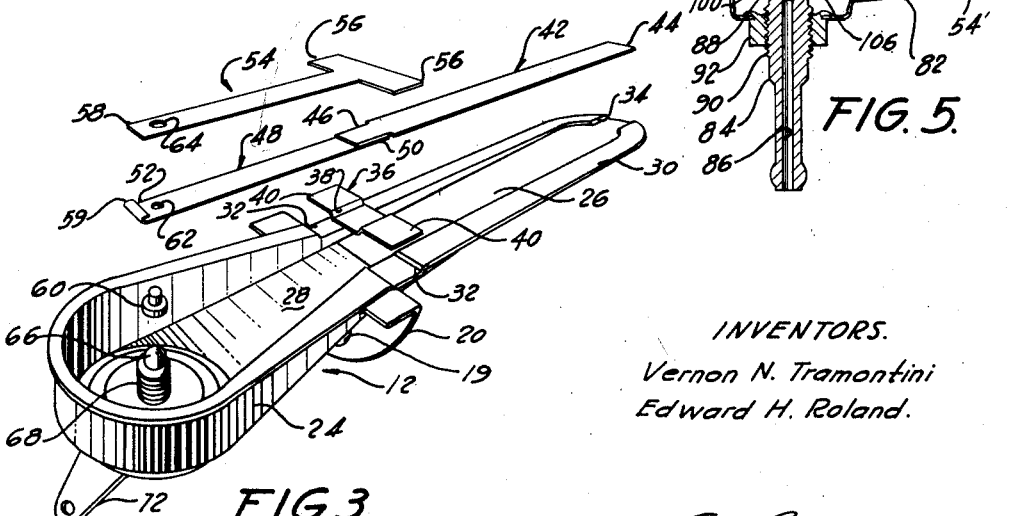
INVENTORS.
Vernon N. Tramontini
Edward H. Roland.
By
Attorney

United States Patent Office 3,132,805
Patented May 12, 1964

3,132,805
TEMPERATURE SENSITIVE CONTROL DEVICE
Vernon N. Tramontini and Edward H. Roland, Indianapolis, Ind., assignors to Stewart-Warner Corporation, Chicago, Ill., a corporation of Virginia
Filed Feb. 15, 1962, Ser. No. 173,535
5 Claims. (Cl. 236—102)

This invention relates to a temperature sensitive control device of the type having temperature sensitive structure which responds to a predetermined change in temperature to actuate directly control means of the device.

It is desirable in many types of equipment to start or stop the equipment at certain desired temperatures, as for example, the minimum or maximum operating temperature. It is common to use a temperature sensitive control device, such as a thermal switch, wherein a temperature sensitive bimetal responds to changes in ambient temperature to actuate a pair of electrical contacts. A control circuit is thereby completed or broken by the contacts to control the equipment as required.

Equipment of this type is that encountered in an automotive exhaust after-burner, or converter, used in smog control. In such, the exhaust gas from the vehicle engine is directed to the converter where the unburned hydrocarbons remaining in the exhaust gas are combusted completely. The gas in the converter thus is at temperatures in the range of 1,000° F. to 1,400° F., and is corrosive in nature. Under these extreme conditions the temperature sensitive control device must detect a predetermined temperature change caused by improper converting so that the proper corrective measures can be taken.

Accordingly, an object of this invention is to provide an economically fabricated temperature sensitive control device operable in a high temperature corrosive atmosphere responsive to a predetermined temperature variation ambient the device.

Another object of this invention is to provide a temperature sensitive control device with an improved temperature sensitive construction including at least two interconnected structures of different thermal expansion coefficients, one structure of which is the device casing.

Another object of this invention is to provide a temperature sensitive control device with an improved motion magnifying arrangement operable to magnify deflection of the temperature sensitive structure sufficiently to actuate directly control means included in the device.

These and other objects will be more fully appreciated after a complete disclosure in the following specification, the drawing forming a part thereof, wherein:

FIG. 1 is a bottom plan view of a first embodiment of the subject temperature sensitive control device;

FIG. 2 is a longitudinal cross-sectional view as seen from line 2—2 of FIG. 1;

FIG. 3 is a perspective view of the device of FIG. 1 showing in a disconnected exploded fashion the lower casing half and the various other components of the device;

FIG. 4 is an enlarged view, similar to FIG. 2, of the blade interlocking means; and FIG. 5 is a partial longitudinal cross-sectional view, similar to FIG. 2, of a second embodiment of the subject temperature sensitive control device.

The subject device is particularly adaptable for use in high temperature, highly corrosive atmospheric conditions; but yet is of simple construction and economical cost. The device includes a sealed outer protective casing which houses the other components and serves as a temperature detecting probe insertable into the atmosphere to be measured. A temperature sensitive structure is formed in and by the casing which has a detectable differential deflection when subjected to some temperature variation. A motion magnifying arrangement within the casing magnifies the small differential deflection to a large deflection operable to actuate directly control means of the device. The control means can complete or break a control circuit as desired.

The entire casing can be composed of two similar sections sealed together at their mating peripheries by appropriate means, such as fusion welding, to fabricate an airtight casing. Thus, the components including the temperature sensitive structure, motion magnifying arrangement, and the control means can be kept free of impurities contained in the ambient measured atmosphere.

Referring now to the drawing, thermal switch 10, shown in FIGS. 1–4, forms a first embodiment of the subject device. The thermal switch 10 includes a pair of matable casing halves or shell portions 12 adapted to be joined together at their periphery to define an elongated casing 14. The elongated casing 14 includes a tapered probe end 16 of relatively small cross-section and an enlarged end 18 separated externally by flange 20. The casing 14 forms internally a continuous chamber 22 extending symmetrically of the longitudinally axis of the switch 10 between the opposite ends of the casing 14.

The probe end 16 is adapted to be inserted into an opening in the converter wall (not shown) up to the flange 20. By proper connection means (not shown) through openings 19 in the flange, the switch 10 can be secured to the converter.

Each casing half 12 includes side walls 24 and interconnecting wall 26 formed in a generally dish-shaped manner to provide an elongated recess 28. The side walls 24 flare outwardly to form a continuous flange 30 around the periphery of the casing half 12 except for aligned opposing recesses 32 and end recess 34 in the flange 30.

A U-shaped spacer element 36 of generally flat stock has a recess 38 intermediate its ends 40. The ends 40 fit within the transverse aligned recesses 32 and are secured to flange 30 as by spot welding. The recess 38 of spacer element 36 thereby is generally aligned with the center axis of chamber 22. A blade structure 42 of simple rectangular cross-section is adapted to be received in the narrow portion of chamber 22 within the probe end 16 of the casing 14. The one end 44 of the blade 42 fits matably within the end recess 34 and is fixed to flange 30 as by spot welding. The opposite end of blade 42 is narrowed off as at 46 to fit within the recess 38 of spacer 36 and is freely slidable thereon axially of the blade 42.

A second blade 48 is fixed at end 50 as by spot welding to the end 46 of the blade 42 and projects from the blade 42 in general axial alignment therewith. Another blade element 54 of generally T-shaped configuration fits matably over the spacer 36, the arm 56 of blade element 54 being spot welded to the ends 40 of the spacer. The body portion of blade 54 extends in general side by side alignment with the blade 48 and is of generally the same axial length terminating at end 58.

The free end 46 of blade 42 and the fixed end 50 of blade 48 secured thereto thus are free to move in an axial direction relative to casing 14 within the recess 38 between spacer 36 and blade element 54. The free end 58 of the blade 54, however, remains generally in an axially fixed position relative to casing 14.

The ends 52 and 58 of the respective blade elements 48 and 54 are generally interlocked by means of a turned-over portion or crimped end of one of the members, as in this case is shown by the crimped end 59 of blade 48 (FIG. 4). In this manner axial movement of the combined blades 42 and 48 within recess 38 is permitted while the interlocked ends 52 and 58 of the blades 48 and 54 are restrained by the interlocking means 59. Thus the blades 48 and 54 act in a manner similar to an eccentrically loaded column in that the interconnected end of blades is caused to deflect laterally of the planar axes of the blades. Thus assuming that the lower blade 48 moves to the right as seen in FIGS. 2, 3 and 4 relative to the upper blade or fixed blade 54, the interconnected ends 52 and 58 of the blades are caused to deflect downwardly relative to the longitudinal axes of the blades.

A rivet-type contact 60 is disposed within opening 62 of blade 48 and flattened over as is well known in the art. Opening 64 in blade 54 aligned with the opening 62 is sufficiently large so that the flattened out rivet of contact 60 does not interbind the blades 48 and 54 except as previously described. Contact 66 is supported adjustably by screw 68 appropriately threaded in insulating structure 70 electrically insulated from the casing 14. Terminal 72 is connected to screw 68 and is thus of common potential as that of contact 66. Thus, a control circuit can be completed by the closed contacts 60 and 66 such as from terminal 72 through ground formed by the casing 14.

It is noted that the blade structure 42 received within the probe end 16 of switch 10 is fixed only at 44 to the casing 14. The probe end 16 of casing 14 and the blade element 42 are of materials of different thermal expansion coefficients and form a temperature sensitive structure, similar in action to a bimetal. Thus, for example, the casing 14 can be 310 stainless steel having a thermal expansion coefficient of $10.9 \times 10^{-6}$ in./in./° F., and the blade 42 can be 430 stainless steel having a thermal expansion coefficient of $6.6 \times 10^{-6}$ in./in./° F. Upon any temperature variation, the probe end 16 is caused to deflect axially a greater distance than that of the blade 42 received therein. It will be appreciated that the differential axial deflection will be of very small magnitude being only $4.3 \times 10^{-6}$ in./in./° F. or the difference between the thermal expansion coefficients of the cited materials. Thus for a 1000° F. temperature difference acting on a probe end structure of 4 inches in length, the differential deflection is less than 1/32".

This differential deflection axially of the casing probe end 16 and blade 42 of less than 1/32" is transmitted also to blade 54 being fixed to the casing (at spacer 36) and blade 48 being fixed to the free end 46 of blade 42. The small axial deflection on freely movable ends 50 and 56 of the generally straight blades 48 and 54, respectively, as previously indicated, causes a greatly magnified deflection of the interconnected ends 52 and 58 of the motion magnifying blades laterally of the planar axis. This is quite apparent since the differential axial expansion of the blades 48 and 54 bends the blades to some arcuate contour (see FIG. 5).

Since the contact is connected to the laterally free end of the blade elements, it travels through a much greater distance than the differential deflection axially of the probe end of the casing. Thus for a change of temperature sufficient to cause relative axial deflection of the bimetal probe end 16 and blade 42, this axial deflection can be magnified to lateral movement twenty to thirty times as great in value. This large deflection is sufficient to cause positive actuation of the contacts 60 and 66 without contact flutter or circuit damage as previously encountered in such switches operating without a toggle mechanism or such to snap the contacts.

The lateral deflection from a planar axis of the free end of a straight member curving in an arcuate contour through a small angle varies in a manner similar to the sine of the angle. On the other hand, the axial deflection of one end relative to the other for a small angle change varies in a manner similar to the cosine of the angle. For a very small change in value of a small angle, the sine varies in value much more rapidly than does the cosine.

Thus for generally planar blade elements 48 and 54 the magnification of the small axial deflection to the larger lateral deflection is of greatest effect when the blades are initially straight and parallel to one another. Therefore, if the thermal switch is to be used in an ambient temperature condition greatly in excess of atmospheric temperature, it is desirable to permit a temperature rise to that proximate the operating ambient condition before interconnecting the free ends 52 and 58 of the blades.

This can be done by maintaining a small distance or space 74 (FIG. 4) between the free end 58 of blade 54 and the interlocking means 59 of blade 48. This space 74 is of such size as is consistent with the differential axial expansion of the probe end 16 and the blade 42 caused by a temperature rise from atmospheric condition to the contemplated operating temperature. Thereafter the blades are interlocked and any further temperature rise causes continued axial deflection now accompanied by the lateral magnification thereof.

The temperature at which control is desired can be varied slightly by adjusting screw member 68 to control the position of the fixed contact 66. Similarly, it is possible with more elaborate structure (not shown) to make the axial position of the blades relative to one another adjustable, to vary the space 74 and the free temperature rise without interlocking the blades.

FIG. 5 shows a cross-sectional view, similar to FIG. 2, of the subject temperature sensitive control device in the form of a thermal valve 80. The valve 80 includes opposing casing halves 82 similar in most details to those of the first embodiment. A pair of motion multiplying blades 48' and 54' are supported within the casing by the temperature sensitive structure (not shown) similar to that of the first embodiment. It will be noted, however, that tht blades 48' and 54' are flipped over as compared to the first embodiment thus giving movement in the opposite direction.

The valve 80 includes a socket 84 having a through-bore 86 terminating at its upper end at valve seat 88. Socket 84 is supported adjustably by threads 90 within bushing 92 mounted on the wall of one casing. The opposite casing wall has therein openings 94 providing an inlet to the chamber defined within the joined casings. A filter element 96 is secured by apertured retainer plate 98 over the openings 94 to prevent ingress of impurities to the chamber.

A valve member 100 has stem 102 extending through an opening on the free end of the blade 54', the stem being headed over and received freely within an enlarged aligned opening in blade 48'. A spring 104 interposed between the blade 54' and valve member 100 biases the valve member in a direction away from the blade. Circumferentially spaced guides 106 around the valve seat 88 guide the valve member 100 to ensure proper seating. The blades 48' and 54' are shown in their deflected position with the valve 80 open.

The thermal valve 80 can be used in conjunction with a vacuum control system as is well known in the art. A vacuum line (not shown) connected to socket 84 can maintain a vacuum in bore 86 when the valve member 100 contacts seat 88 and closes the valve 80. Upon deflection of the temperature sensitive structure (not shown) the motion magnified blades 48' and 54' lift the valve member 100 from the valve seat 88. This permits infiltration of air from the outside through-openings 94, filter 96, retainer plate 98, and bore 86 as is apparent to destroy the vacuum and actuate the control. Upon closing of the valve by the return of the blades 48' and 54' to the undeflected position, spring 104 is effective to maintain the valve member 100 seated against valve seat 88. The opening and closing setting of the control valve can be adjusted by threading the socket 84 within the bushing 92 toward or away from the valve member.

While specific embodiments have been shown, it will be obvious to those skilled in the art that other arrangements are possible. Thus it is desired that the invention be limited only by the scope of the claims hereinafter following.

What is claimed is:

1. A temperature sensitive control device, comprising in combination, temperature sensitive means including a bimetal structure operable responsive to changes in temperature ambient said structure to deflect by a detectable differential deflection in a given direction and responsive to a change from the ambient atmospheric temperature to a given temperature approximately at the normal operating temperature of the device to deflect by a given differential deflection, motion magnifying means operable to magnify the differential deflection of said structure, said motion magnifying means including two separate straight elongated spring blade elements in generally parallel side-by-side disposition having corresponding ends thereof adjacent one another, interlocking means on the last-mentioned ends of the blade elements effective to permit unrestricted axial movement of the adjacent ends relative to one another an amount equal to said given differential deflection and thereafter to lock the adjacent ends of the blade elements together, means for transmitting the differential deflection of the bimetal structure to the opposite ends of the elongated elements in the direction of the longitudinal axes thereof, operable thereby to deflect the interlocked ends in a direction transverse to the plane of the elongated elements, and control means adjacent the interlocked ends of the elongated elements actuated directly by said elements responsive to a predetermined change in ambient temperature beyond said given temperature.

2. A temperature sensitive control device, comprising in combination, an elongated hollow casing of substantially narrowed cross-section compared to its length, an elongated blade structure secured at one of its ends to the casing proximate one end portion thereof and extending within the casing away from said end portion, said blade structure and casing being of materials of different thermal expansion coefficients, so that a change in temperature ambient the casing causes a detectable movement of the free opposite end of the blade structure with respect to an intermediate portion of the casing spaced from said end portion, an elongated blade element secured at one of its ends to the casing proximate said intermediate portion and extending in side-by-side relationship with respect to said blade structure, interlocking means at the opposite ends of the blade structure and element operable to permit free axial movement of the ends relative to one another a distance corresponding generally to the differential movement caused by an ambient temperature change from the non-operating temperature to the operating temperature of the device and thereafter to restrict relative movements thereof, with any continued detectable movement causing the opposite ends to move laterally of said blade structure and element, and control means disposed within the casing laterally of the blade structure and element proximate the opposite ends thereof and actuated thereby.

3. A temperature sensitive control device, comprising in combination, an elongated hollow casing having an end probe portion of substantially narrowed cross-section compared to its length, generally straight elongated blade structure secured at one of its ends to the casing proximate the outward end of the probe portion, and extending within the probe portion to at least the inward end thereof, said blade structure and probe portion being of materials of different thermal expansion coefficients, so that a change in temperature ambient the probe portion causes a detectable differential deflection between the free opposite end of the blade structure and the inward end of the probe portion, a generally straight elongated blade element secured at one of its ends to the casing proximate the inward end of the probe portion and extending in general alignment with said elongated structure, means at the otherwise separated opposite ends of the blade structure and element operable to permit free relative movement of the ends a distance corresponding generally to the differential deflection thereof caused by a temperature change from the non-operating ambient condition to the normal operating ambient condition of the device and thereafter to interlock said ends against relative axial movements thereof, any continued differential deflection causing the interlocked opposite ends of the blade structure and element to move laterally thereof, and control means disposed laterally of the opposite ends of the blade structure and element and actuated directly thereby.

4. A temperature sensitive control device, comprising in combination, an elongated hollow casing having a probe end portion of substantially narrowed cross-section compared to its length and of air-tight construction, generally straight blade structure secured at one of its ends to the probe portion proximate its outward end and extending in general alignment therewith, said blade structure and probe portion being of materials of different thermal expansion coefficients, so that a change in temperature ambient the probe portion causes a detectable differential deflection of the free opposite end of the blade structure axially of the probe portion at its inward end, a generally straight blade element in the chamber secured at one of its ends to the probe portion proximate its inward end and extending in general alignment therewith, interlocking means at the otherwise separate opposite ends of the blade structure and element operable to allow limited axial movement thereof relative to one another a distance corresponding generally to the differential deflection caused by a temperature change ambient the probe portion from the normal non-operating condition to within the range of the normal operating condition of the device and operable thereafter to interlock the opposite ends against continued relative axial movements, any continued relative axial movement causing the opposite ends to move in a lateral direction relative to said probe end, and control means on the lateral side of the blade structure and element proximate the opposite ends thereof and actuated directly thereby.

5. A temperature sensitive control device, comprising in combination, an elongated hollow casing having a probe end portion of substantially narrowed cross-section compared to its length, a generally straight blade secured at one of its ends to the probe portion proximate its outward end and extending within the casing at least to the inward end thereof, the blade and probe portion being of materials of different thermal expansion coefficients, so that a change in temperature ambient the probe portion causes a detectable axial movement of the opposite end of the blade relative to the inward end of the probe portion, a second generally straight blade secured at one of its ends to the casing proximate the inward end of the probe portion and extending in aligned side-by-side disposition with the first-mentioned blade, means for maintaining the blades generally in the above-mentioned disposition, the opposite end of one of the blades being bent over the opposite end of the other blade to confine the opposite ends of the blade transversely, but being spaced apart axially at normal non-operating conditions of the device to allow limited axial movement thereof relative to one another and operable thereafter to interlock the opposite ends against continued axial movements, any continued axial movement of the blades causing the opposite ends thereof to move laterally of said blades, the axial spacing between the previously-mentioned opposite ends of the blades corresponding generally to the axial movement of the blades caused by a change in ambient temperature from normal non-operating conditions approximately to the normal operating temperature, and control means actuated directly by said blades, said control means including a first control element secured on the lateral side of one of the blades proximate its opposite end operable to move laterally therewith, a second control element secured to the casing in lateral alignment with the first control element operable to be contacted thereby, and means operable to move the second control element toward or away from the first control element to adjust the ambient temperature of the probe end effective to actuate the control means.

References Cited in the file of this patent

UNITED STATES PATENTS

| | | |
|---|---|---|
| 1,777,272 | Beam | Sept. 30, 1930 |
| 1,897,155 | Vaughn | Feb. 14, 1933 |